US011778023B2

(12) United States Patent
Henkens et al.

(10) Patent No.: US 11,778,023 B2
(45) Date of Patent: *Oct. 3, 2023

(54) SHARED CHANNEL INVITATION PATHS

(71) Applicant: Slack Technologies, LLC, San Francisco, CA (US)

(72) Inventors: Sarah Henkens, Mission Bay, CA (US); Jacquelyn Rocca, San Francisco, CA (US); Samir Ketema, Emeryville, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,519

(22) Filed: Oct. 5, 2022

(65) Prior Publication Data
US 2023/0029402 A1   Jan. 26, 2023

Related U.S. Application Data

(63) Continuation of application No. 17/503,822, filed on Oct. 18, 2021, now Pat. No. 11,496,561, which is a continuation of application No. 17/118,180, filed on Dec. 10, 2020, now Pat. No. 11,153,377.

(51) Int. Cl.
| G06F 15/16 | (2006.01) |
| H04L 29/06 | (2006.01) |
| H04L 29/08 | (2006.01) |
| H04L 67/104 | (2022.01) |
| H04L 9/40 | (2022.01) |
| G06F 21/62 | (2013.01) |
| H04L 51/48 | (2022.01) |

(52) U.S. Cl.
CPC ...... *H04L 67/1046* (2013.01); *G06F 21/6218* (2013.01); *H04L 51/48* (2022.05); *H04L 63/18* (2013.01)

(58) Field of Classification Search
CPC . H04L 67/1046; H04L 67/1044; H04L 51/48; H04L 63/18; G06F 21/6218
USPC ............................................. 709/204
See application file for complete search history.

(56) References Cited

U.S. PATENT DOCUMENTS 10,805,101 B1 * 10/2020 Wang ............... H04L 63/0861
2013/0090171 A1 * 4/2013 Holton ............... A63F 13/795
                                                        463/42

(Continued)

OTHER PUBLICATIONS

"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013) 2 pages.

(Continued)

Primary Examiner — Ruolei Zong
(74) Attorney, Agent, or Firm — Erise IP, P.A.

(57) ABSTRACT

Computer-readable media, method, and system for inviting a plurality of users to a group-based communication channel within a group-based communication system. The plurality of users are invited by transmitting a respective plurality of invitations to the users upon a sending user instruction. The outcome of a user accepting an invitation may be determined based on an approval privilege of the user and a status of the group-based communication channel.

20 Claims, 10 Drawing Sheets

(56) References Cited

U.S. PATENT DOCUMENTS

| | | | |
|---|---|---|---|
| 2015/0006214 A1* | 1/2015 | Lavoie | G06Q 10/063118 |
| | | | 705/7.17 |
| 2015/0067181 A1* | 3/2015 | Roy | H04L 67/02 |
| | | | 709/227 |
| 2015/0106142 A1* | 4/2015 | Ristock | G06Q 10/10 |
| | | | 705/310 |
| 2018/0276593 A1* | 9/2018 | Perret | G06F 16/9535 |
| 2018/0287982 A1 | 10/2018 | Draeger et al. | |
| 2019/0244173 A1* | 8/2019 | Tanabe | G06Q 10/06 |
| 2020/0195459 A1* | 6/2020 | Liu | H04L 12/1822 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 13 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LEXISNEXIS, https://advance_lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SHARED CHANNEL INVITATION PATHS

RELATED APPLICATIONS

This patent application is a continuation application claiming priority benefit, with regard to all common subject matter, of U.S. patent application Ser. No. 17/503,822, filed Oct. 18, 2021, entitled "SHARED CHANNEL INVITATION PATHS" ("the '822 application"). The '822 application is a continuation application claiming priority benefit, with regard to all common subject matter, of U.S. patent application Ser. No. 17/118,180, filed Dec. 10, 2020, now U.S. Pat. No. 11,153,377, issued Oct. 19, 2021, and entitled "SHARED CHANNEL INVITATION PATHS." The above-referenced applications are hereby incorporated by reference in their entirety into the present application

TECHNICAL FIELD

Embodiments of the invention relate to group-based communication systems and, more particularly, to managing multiple concurrent electronic invitations within group-based communication systems.

Traditionally, concurrent invitation sent to multiple users to join a channel within group-based communication systems lead to confusion when one user accepts an invitation that has already been accepted by another user. For example, if a user accepts an invitation to join a communication channel that has already been joined by a different user an error may occur because the proposed action has already been taken. This can lead to user confusion regarding whether the channel was joined.

Further, multiple invitations may be sent out simultaneously to a respective plurality of users where the sender of the invitations does not know which of the users will respond first. A race condition may result depending on which user with approval privileges first accepts the invitation, where users without approval privileges who accept the invitation may not be added to the channel, which is undesirable. Accordingly, the sender may send a single invitation at a time to avoid confusion between the users, such as a non-administrator or user without approval privileges accepting an invitation and receiving an error because the user does not have the required permissions to approve joining the channel.

Accordingly, what is needed is an invitation system that transmits dynamic invitations based on the type of user and the status of the communication channel.

SUMMARY

Embodiments of the invention solve the above-mentioned problems by providing a dynamic invitation system and method for adding a plurality of users to a group-based communication channel, wherein the contents and path of each respective invitation may be adjusted according to the permissions of the respective user and the status of the group-based communication channel.

A first embodiment of the invention is directed to one or more non-transitory computer-readable media storing computer-executable instructions that, when executed by a processor, perform a method for inviting a plurality of users to a group-based communication channel within a group-based communication system, the method comprising the steps of receiving, from a first user of a first organization, an instruction to add a second user of a second organization to the group-based communication channel, in response to receiving the instruction from the first user, transmitting a first invitation to the second user, receiving an acceptance of the first invitation from the second user, in response to determining that the second user of the second organization does not have approval privileges, adding the second user to a list of pending users to be added to the group-based communication channel, and in response to determining that the second user of the second organization has approval privileges, joining the second organization to the group-based communication channel and adding the second user and the list of pending users to the group-based communication channel.

A second embodiment of the invention is directed to a method for inviting a plurality of users to a group-based communication channel within a group-based communication system, the method comprising the steps of receiving, from a first user of a first organization, an instruction to add a second user of a second organization to the group-based communication channel, in response to receiving the instruction from the first user, transmitting a first invitation to the second user, receiving an acceptance of the first invitation from the second user, in response to determining that the second user of the second organization does not have approval privileges, adding the second user to a list of pending users to be added to the group-based communication channel, and in response to determining that the second user of the second organization has approval privileges, joining the second organization to the group-based communication channel and adding the second user and the list of pending users to the group-based communication channel.

A third embodiment of the invention is directed to a system for inviting a plurality of users to a group-based communication channel within a group-based communication system, the system comprising a group-based communication system server, and a processor programmed to perform a method of inviting a plurality of users to a group-based communication channel within a group-based communication system, the method comprising the steps of receiving, from a first user of a first organization, an instruction to add a second user of a second organization to the group-based communication channel, in response to receiving the instruction from the first user, transmitting a first invitation to the second user, receiving an acceptance of the first invitation from the second user, in response to determining that the second user of the second organization does not have approval privileges, adding the second user to a list of pending users to be added to the group-based communication channel, and in response to determining that the second user of the second organization has approval privileges, joining the second organization to the group-based communication channel and adding the second user and the list of pending users to the group-based communication channel.

Additional embodiments of the invention are directed to deleting data associated with an invitation upon denial of the invitation or expiration of the invitation.

Further, embodiments are directed to presenting a visibility control interface to a user based on the user's permissions and allowing the user to adjust visibility control settings associated with a group-based communication channel.

Further still, embodiments are directed to converting at least one group-based communication channel invitation to an open channel prompt in response to determining that a group-based communication channel has already been joined. In such embodiments, the open channel prompt allows a user to open an instance of the group-based communication channel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 3A:
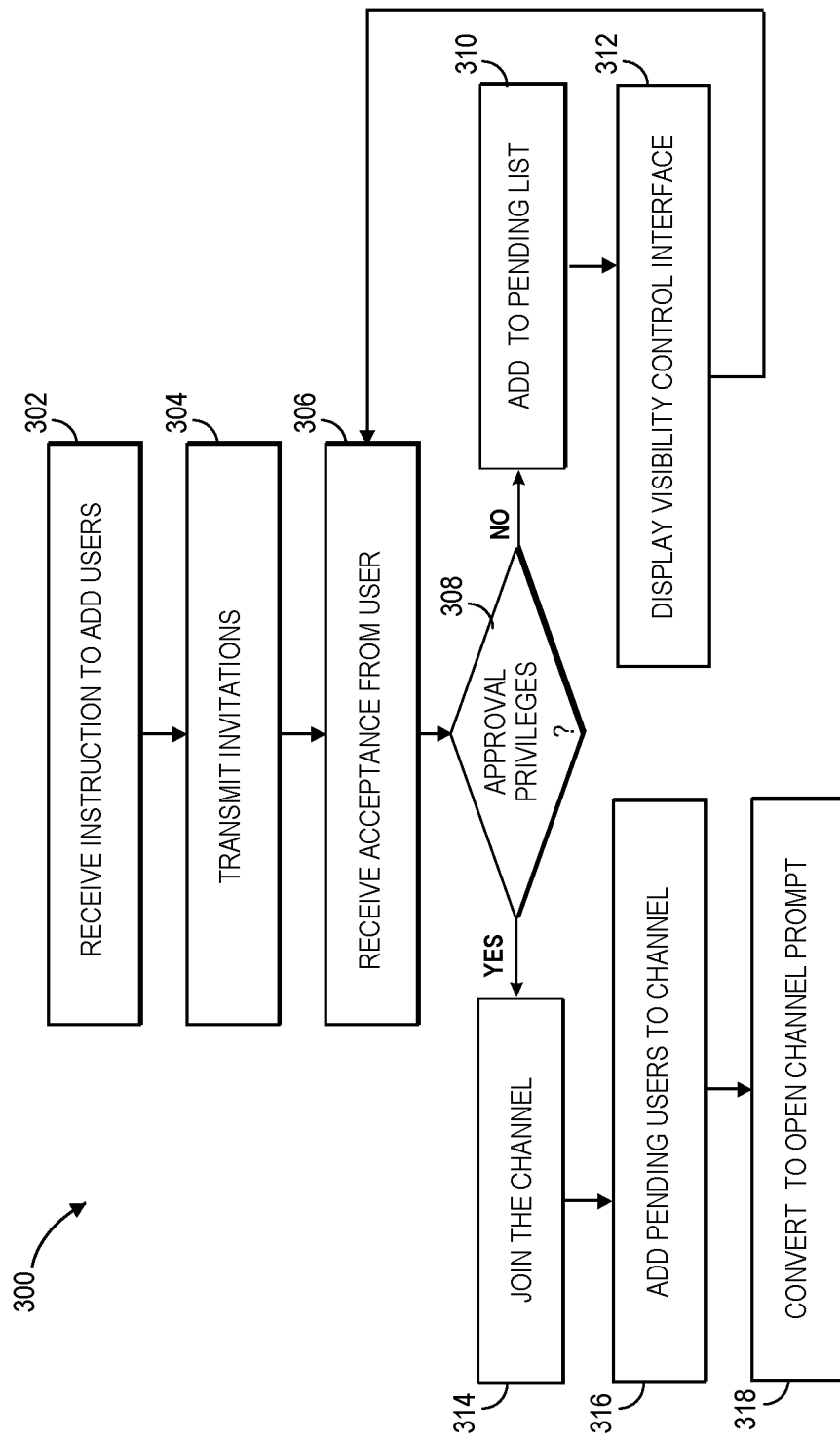
FIG. 3A depicts a method for inviting users to a group-based communication channel relating to some embodiments of the invention.
Figure 3B:
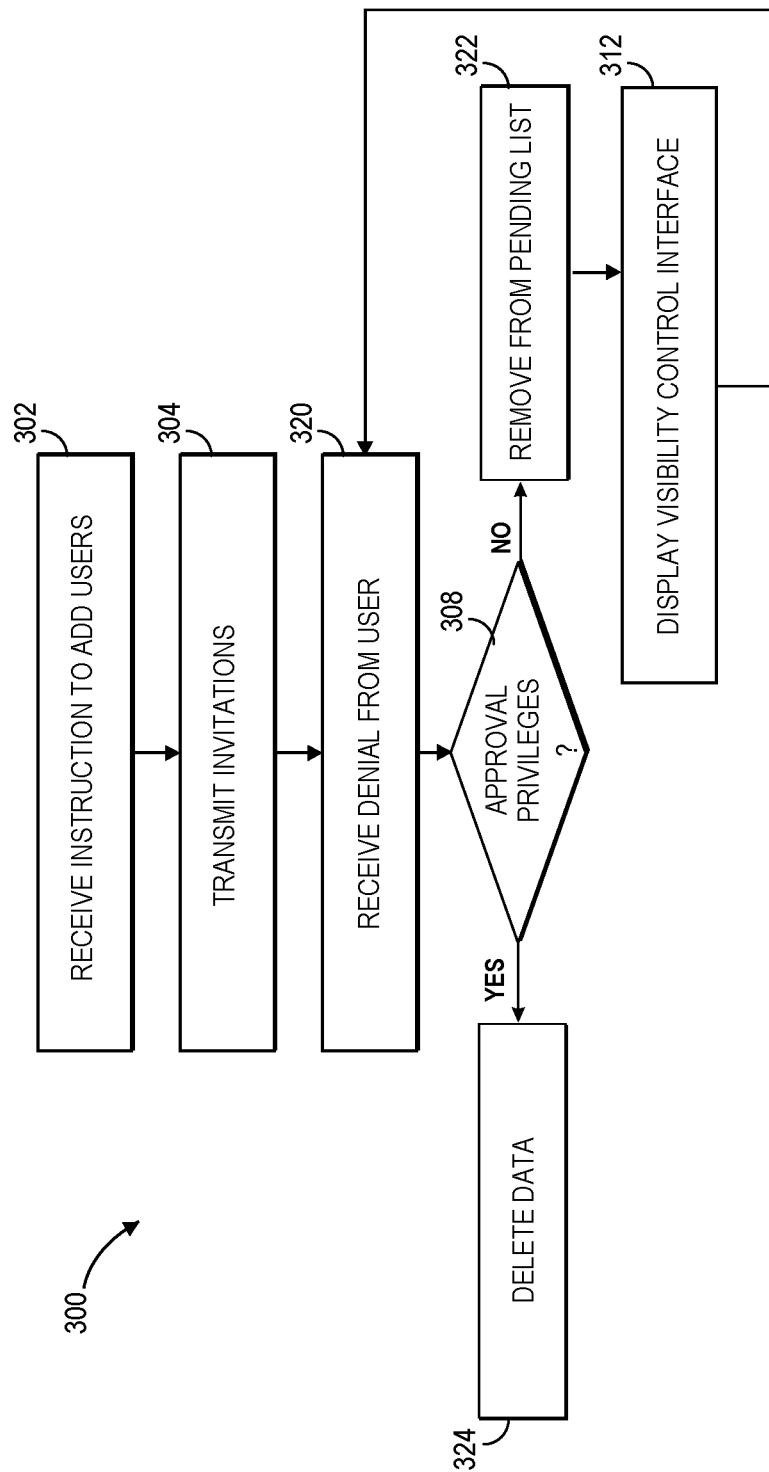
FIG. 3B depicts a method for deleting invitation data relating to some embodiments of the invention.
Figure 3C:
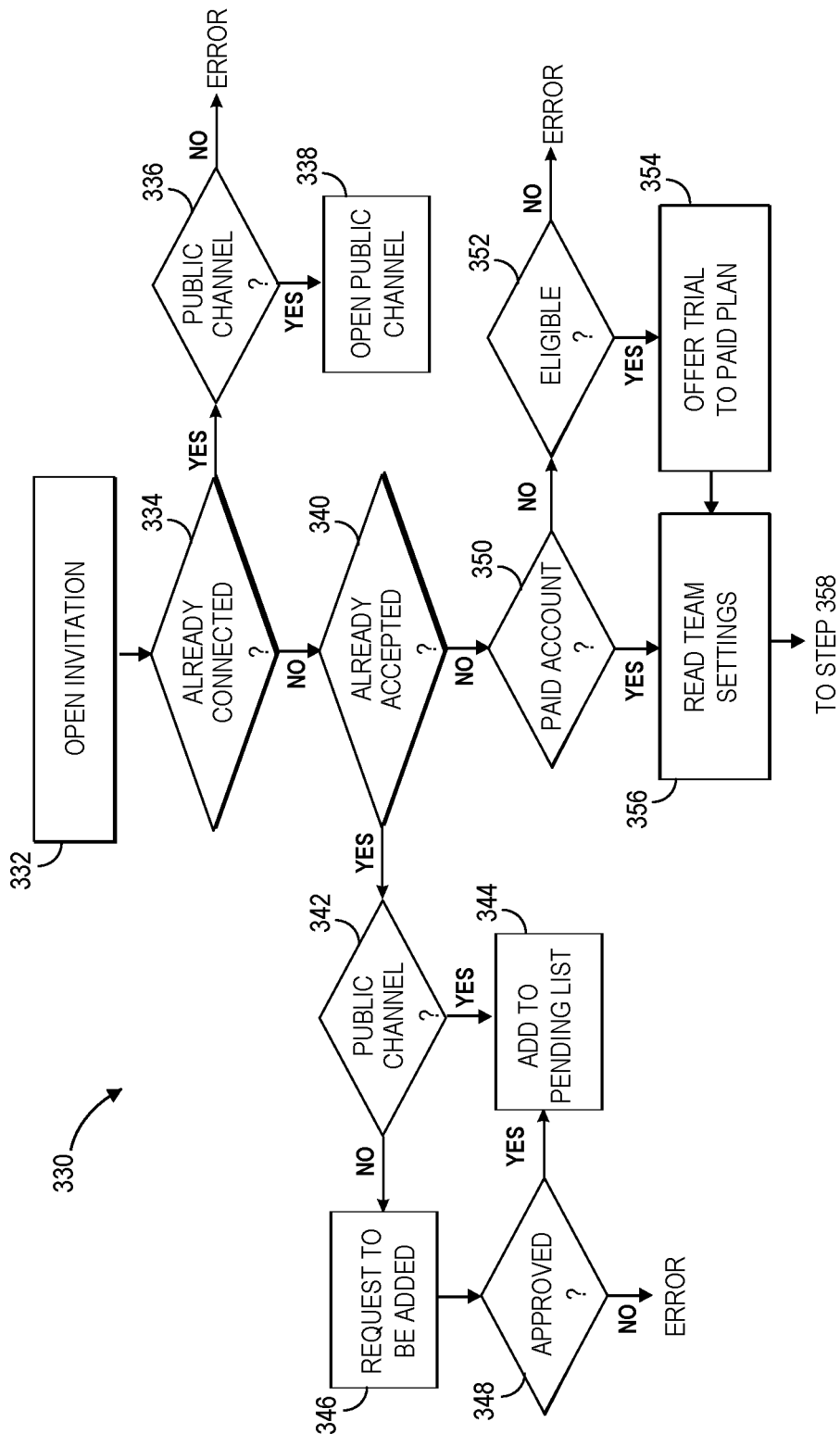
Figure 3D:
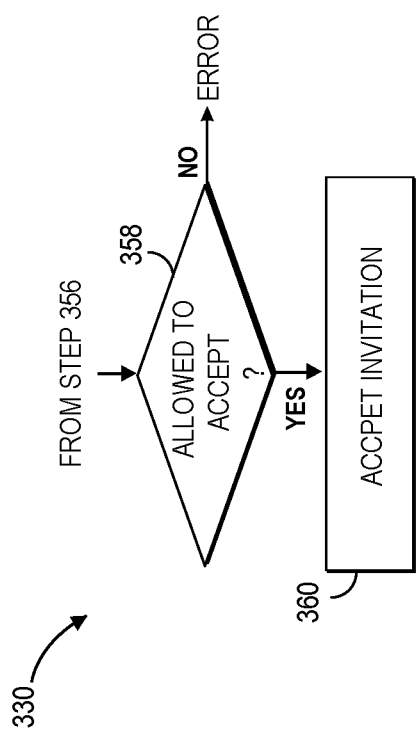
Figure 4:
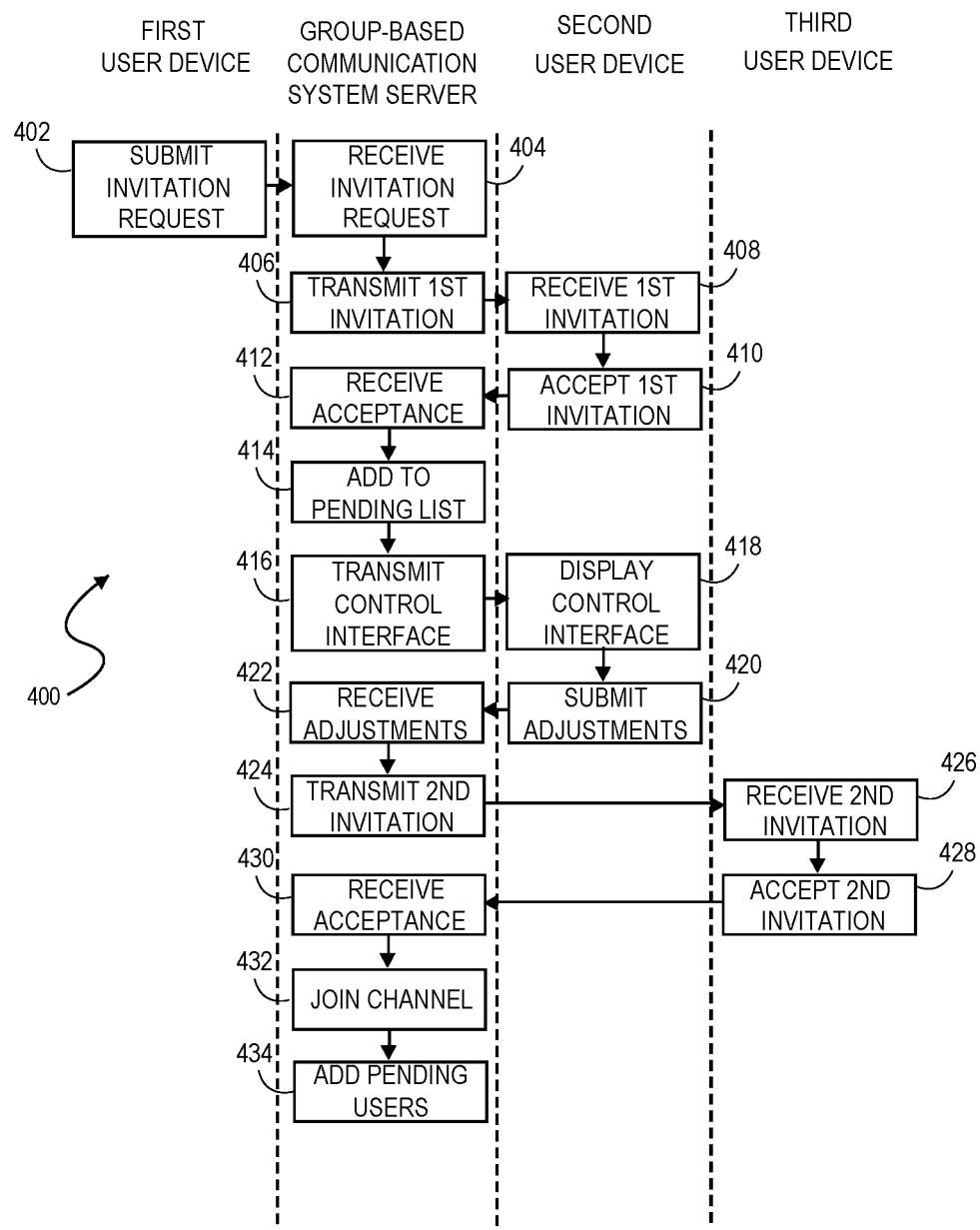
Figure 5A:
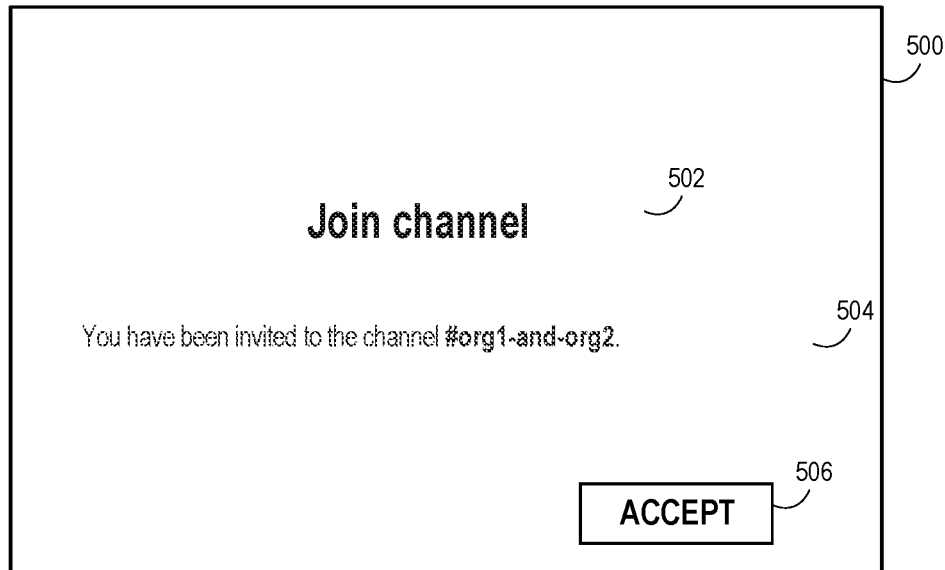
Figure 5B:
Figure 5C:
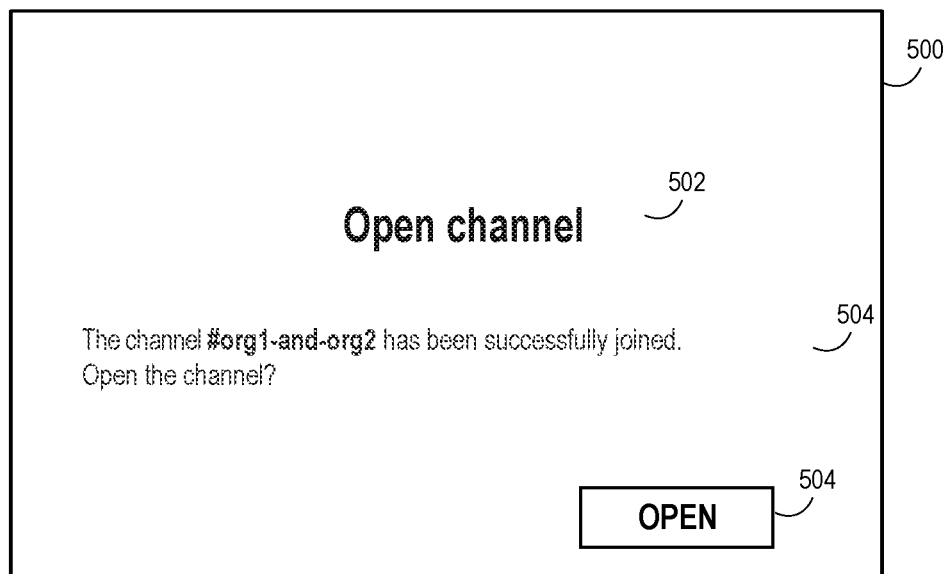

FIGS. 3C and 3D collectively depict a method for opening and accepting an invitation relating to some embodiments of the invention;

FIG. 4 depicts a swim lane diagram illustrating component responsibility flow for inviting users to a group-based communication channel relating to some embodiments of the invention;

FIG. 5A depicts an exemplary screenshot of a user interface relating to some embodiments of the invention;

FIG. 5B depicts an exemplary screenshot of a user interface relating to some embodiments of the invention; and FIG. 5C depicts an exemplary screenshot of a user interface relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1A:
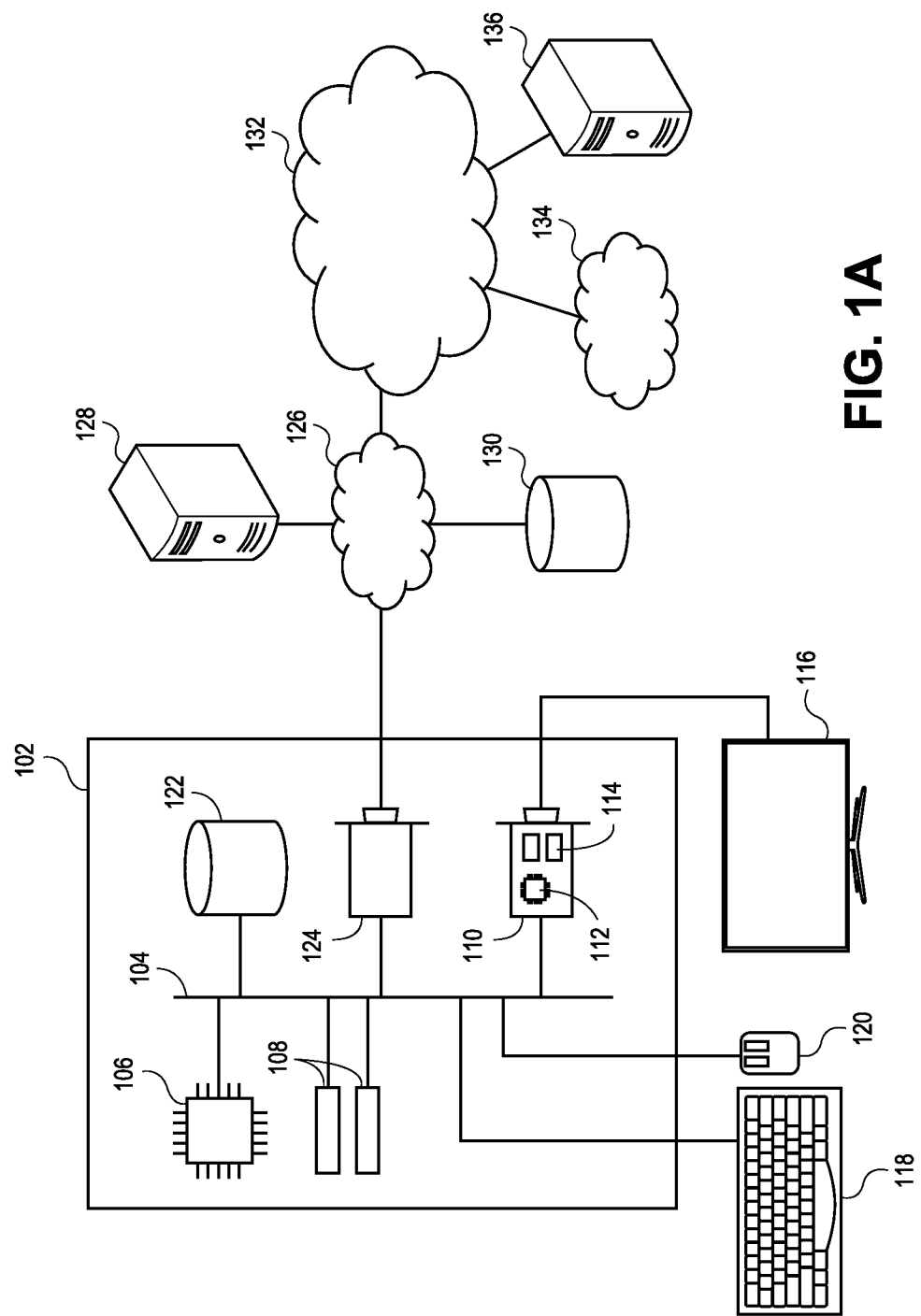
FIG. 1A depicts an exemplary hardware platform for certain embodiments of the invention.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
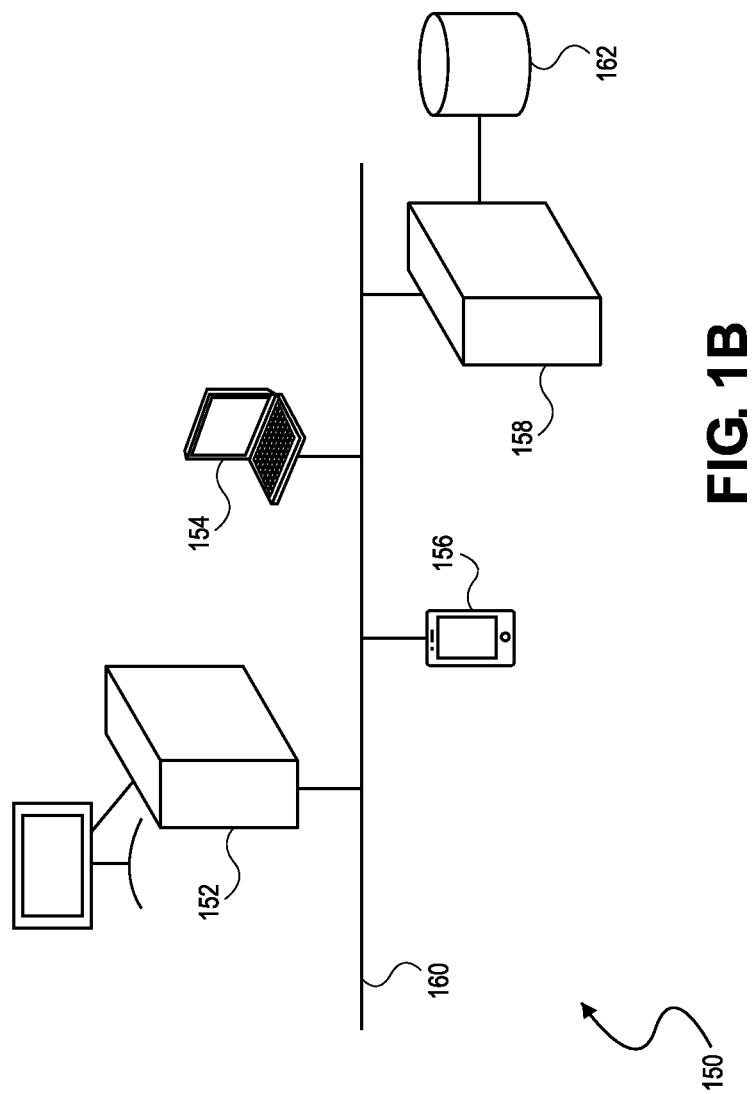
FIG. 1B depicts an exemplary diagram illustrating components of a system for carrying out embodiments of the invention.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the functions described herein with respect to a processor may be carried out by the processors within any of the devices described herein. For example, in some embodiments, a processor within the group-based communication system server 158 may perform a first function, while a processor within the client device performs a second function.

Figure 2:
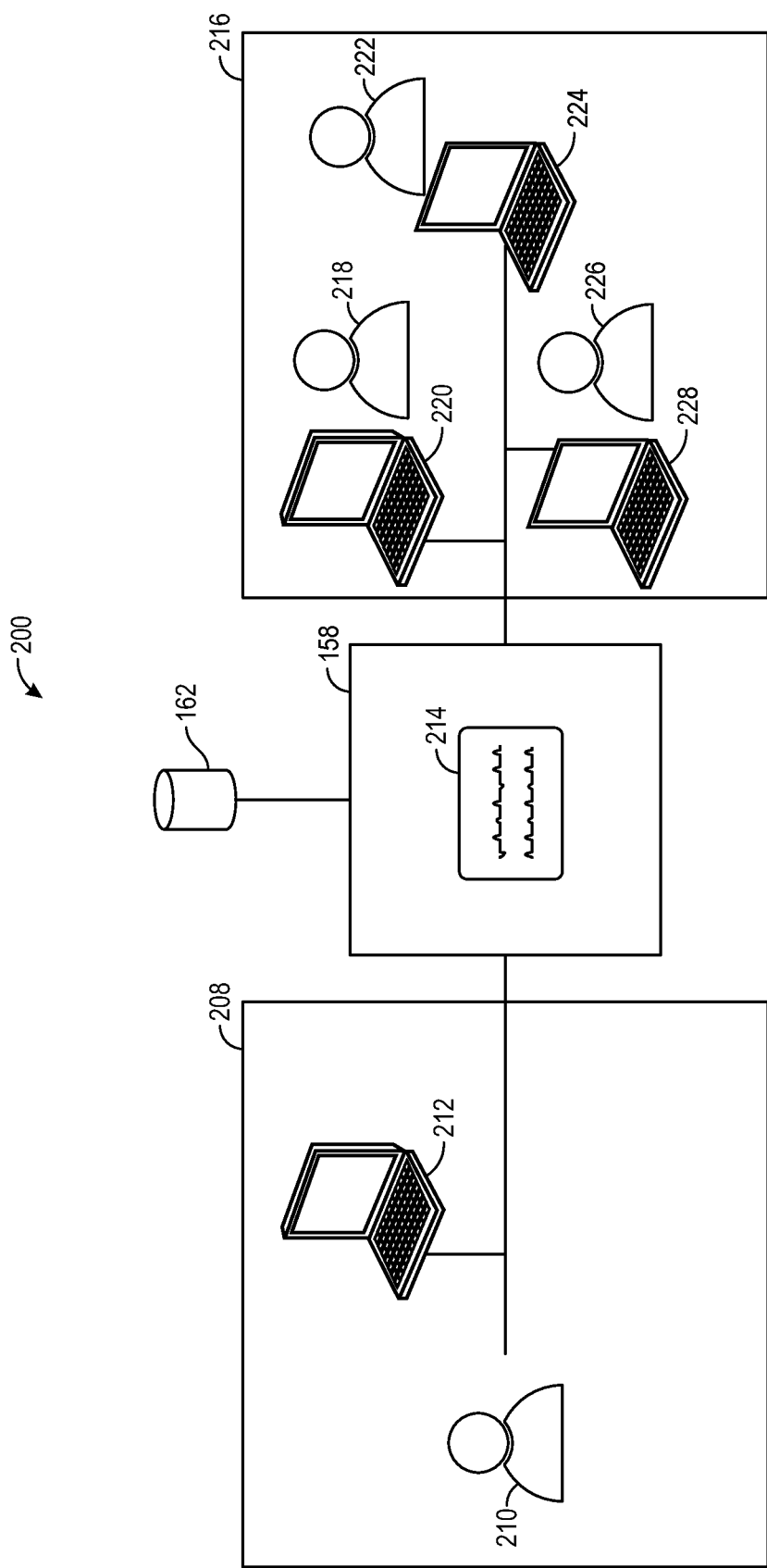
FIG. 2 depicts an invitation system relating to some embodiments of the invention.

Turning now to FIG. 2, an invitation system 200 is depicted relating to some embodiments of the invention. The invitation system 200 comprises the group-based communication system server 158 and group-based communication system data store 162 as described above with reference to FIG. 1B. Here, the group-based communication system server 158 communicates with users of a first organization 208, such as a first user 210 operating a first user device 212. The first user device 212 may be any of a laptop, a mobile phone, a desktop computer, or other suitable user device, such as the client devices 152, 154, and 156 described herein or another suitable computing device. The first user 210 may use the first user device 212 to request at least one invitation be generated within the group-based communication system. In some embodiments, the at least one invitation may be an invitation to join a group-based communication channel within the group-based communication system.

The invitation request may be received by the group-based communication system server 158 and transmitted to another user to invite said user to the group-based communication channel. In some embodiments, the at least one invitation 214 comprises a plurality of invitations that are requested, generated, and transmitted to a respective plurality of users. For example, in some embodiments, the group-based communication system server 158 may transmit the plurality of invitations to users of a second organization 216, such as a second user 218 operating a second user device 220, a third user 222 operating a third user device 224, and a fourth user 226 operating a fourth user device 228, as shown. In some embodiments, each of the plurality of invitations is associated with a respective unique uniform resource locator (URL) used to locate the invitation on the internet or to locate information associated with the invitation. Accordingly, the group-based communication system server 158 may associate invitations to the same channel with one another based on their associated URLs.

It should be understood that, in some embodiments, the invitation comprises at least one of a name of the inviting user, a name of the invited user, a name of the group-based communication channel, a name of the first organization 208, a name of the second organization 216, a date and time the invitation was generated, an expiration time associated with the invitation, and a unique URL specific to and associated with the invitation. In some embodiments, each invitation has an expiration time for which the invitation remains active. For example, the invitation may have an expiration time of one week, such that the invitation, if not accepted, will expire one week after being generated and will no longer be active. Further, in some embodiments, data associated with the invitation or the invited organization may be deleted upon expiration of the invitation. Similarly, data associated with the invitation or the invited organization may be deleted upon a user of the invited organization with approval privileges denying the invitation. It should be understood that the expiration time of one week is just one example and that a variety of different expiration durations may be included. For example, the expiration duration may be one day, two days, one week or two weeks. Further, in some embodiments, the expiration time of the invitation may be selected and specified by a user, such as the inviting user who initiates the invitation.

It should be understood that the group-based communication channel in some embodiments, is a new group-based communication channel created by the first user 210 at the same time or after the at least one invitation is requested. In some embodiments, the group-based communication channel is created when the channel is joined by the second organization 216. Alternatively, in some embodiments, the group-based communication channel is an existing group-based communication channel that has already been established.

In some embodiments, the invitation further comprises an invitation transmitted to a fifth user of a third organization, such that the group-based communication channel may be joined between the first organization 208, the second organization 216, and the third organization. In some embodiments, joining an organization to the group-based communication channel may require that the invitation is accepted by an administrator user of the respective organization or a user with approval privileges or permission to grant approval to add users of the respective organization. For example, in some embodiments, the third user 222 of the second organization 216 has approval privileges. It should be understood that a user with approval privileges, as used herein, may refer to a user of an organization that has permission to join an organization and other users from that organization to a group-based communication channel which may include other organizations. For example, a specific user may not be an administrator in the traditional sense of management, but may be granted permission to accept a join invitation received from a different organization by another user. As such, the specific user would be considered to have approval privileges. In some embodiments, the permission to join a channel may be determined based on an attribute associated with a user identity. For example, a set of user information including the attribute of approval privileges may be stored on the group-based communication system data store 162 and associated with a specific user.

Turning now to FIG. 3A, a method for inviting users to a group-based communication channel relating to some embodiments is depicted and referred to generally by reference numeral 300. It should be understood that, in some embodiments, any of the steps described herein may be performed by a processor. For example, the steps of method 300 may be performed by executing a set of instructions by CPU 106. In some embodiments, the steps of method 300 may be carried out by a processor of the group-based communication system server 158. At step 302, instructions are received from a user. In some embodiments, the instructions comprise an instruction to add at least one user to the group-based communication channel within the group-based communication system. In some embodiments, the user that provides the instruction to add users is a user of a specific organization, such as first user 210 of first organization 208, as shown in FIG. 2. Here, the first user 210 may submit an input using first user device 212 to instruct that a plurality of users be invited to the group-based communication channel. In some embodiments, at least one of the invited users may belong to a different organization distinct from the first organization 208. For example, the first user 210 may invite the second user 218 and the third user 222 from the second organization 216.

After receiving the instruction to add users, invitations are transmitted at step 304. In some embodiments, the invitations are transmitted in response to the received instruction from the user. For example, the user may click a submit or send button within a graphical user interface presented to the user and associated with the group-based communication system. In some embodiments, the invitations are transmitted over a network such as network 160. For example, the invitations may be sent to an email address of each respective invited user or transmitted to a group-based communication system account of each respective invited user. In some embodiments, a single invitation may be sent to a single invited user. Alternatively, in some embodiments, a plurality of invitations may be sent to a respective plurality of invited users. For example, a first invitation may be transmitted to the second user 218 and a second invitation may be transmitted to the third user 222. In some embodiments, invitations may be sent through a direct message or phone number for each respective invited user.

At step 306 an acceptance of one of the transmitted invitations is received from one of the invited users. In some embodiments, receiving the acceptance may comprise receiving an input from the invited user, such as the invited user selecting an accept button associated with the invitation. In some embodiments, before an acceptance can be received an eligibility of the invited user may be checked. Here, the eligibility of the invited user may depend on the user completing a task, such as signing a form associated with the invitation. For example, in some embodiments, all invited users must complete a form before the users are eligible to accept the invitations. Alternatively, in some embodiments, such eligibility may not be considered and users may simply accept the invitations. Further, in some embodiments, eligibility requirements may be selected by the first user 210 along with the invitation instructions received at step 302.

At step 308 it is determined whether the accepting invited user has approval privileges. Here, the determination may be made as to whether the invited user has approval privileges by querying an account associated with the invited user on the group-based communication system. The group-based communication system may store a plurality of user accounts including user information, such as permissions associated with each respective account. Accordingly, in some embodiments, it can be determined whether the invited user has approval privileges by checking a permission of the invited user's account. In some embodiments, user information, permissions, and account information may be stored on the group-based communication system data store 162 as attributes of the user account. In some embodiments, the ability to approve an invitation to add a user or organization is based in part on a series of checks based on channel type, user permissions, team settings to determine if the authenticated user is eligible to accept the invite (join shared channel) or not.

If it is determined that the invited user does not have approval privileges, the method continues to step 310, where the invited user is added to a list of pending users. Here, the list of pending users may be a list of user accounts that have accepted invitations to the group-based communication channel before the group-based communication channel has been joined between organizations. After the invited user has been added to the list of pending users, a visibility control interface may be displayed to the invited user at step 312. The visibility control interface may be displayed to the invited user based on at least one permission associated with the invited user's account on the group-based communication system. In some embodiments, the visibility control interface is presented to the user such that the visibility of settings that the user does not have access to adjust is suppressed. Accordingly, only settings to which the user has access to adjust are presented to the user. In some embodiments, users may have access to edit settings associated with the group-based communication channel before the group-based communication channel is joined. For example, in one embodiment, the invited user is a security manager of the second organization 216 who has access to adjust security settings within the group-based communication channel. Accordingly, the security manager will be presented a prompt to adjust the security settings by the visibility control interface.

If it is determined that the invited user has approval privileges, the group-based communication channel is joined at step 314. In some embodiments, joining the group-based communication channel may comprise adding an additional organization to the group-based communication channel, along with at least one user from said additional organization. For example, if a user of the second organization 216 with approval privileges accepts an invitation from the first user 210 of the first organization 208, the second organization 216 may be joined to the group-based communication channel. At step 316, when the group-based communication channel is joined, the list of pending users is added to the group-based communication channel. For example, if a plurality of users who do not have approval privileges previously accepted invitations to the channel and were added to the list of pending users, then the plurality of users will be added once the channel is joined. Additionally, at step 318, once the group-based communication channel is joined, any remaining invitations may be converted from invitations into open channel prompts. When accepted by users, such open channel prompts will instead open an instance of the group-based communication channel to the accepting user.

In some such embodiments, the open channel prompt may be displayed similar to or identical to the invitation. However, when accepted, the open channel prompt initiates a different outcome than that of the original invitation. Alternatively, in some embodiments, when converted to an open channel prompt, the invitation is displayed differently. For example, the open channel prompt may notify the invited user that the group-based communication channel has already been joined by user with approval privileges and may prompt the invited to open the channel. In some embodiments, the open channel prompt may be presented to the user as a user interface, such as user interface 500 of FIG. 5C, which depicts an exemplary open channel prompt. In some embodiments, users may be added to the group-based communication channel without accepting an invitation. For example, if a user with approval privileges accepts an invitation all invited users of that user's organization may be automatically added to the channel.

It should be understood that the method 300 is not limited to the steps shown in FIG. 3A and in some embodiments, the method 300 further comprises various additional authentication and acceptance steps. For example, in some embodiments, when the acceptance is received at step 306 an additional step of verifying and authenticating the user may be performed. Here, the user may be authenticated using two factor authentication or a similar authentication technique. Additionally or alternatively, the user may be verified based on an account used to accept the invitation. For example, if the group-based communication system server 158 determines that the email address of the user that accepts the invitation matches the email address to which the invitation was sent, then the user may be automatically verified and accepted.

Turning now to FIG. 3B, an alternative scenario of method 300 is depicted relating to some embodiments, where the invited user denies the invitation at step 320. Here, steps 302 and 304 may be performed as described above with reference to FIG. 3A. However, instead of accepting the invitation the invitation is denied. After receiving the denial from the invited user, it is determined whether the user has approval privileges step 308. If the invited user does not have approval privileges, the method moves on to step 322 where the invited user may be removed from a pending list of users, such that the invited user is not automatically added to the channel if the channel is joined. In some embodiments, the invited user may still be presented with the visibility control interface at step 312. Alternatively, in some embodiments, if the invited user denies the invitation the visibility control interface is not displayed.

If it is determined that the invited user who has denied the invitation has approval privileges, data may be deleted at step 324. Here, the deleted data may include at least one of data associated with the invited user's organization, data relating to the group-based communication channel, or the invitation itself, as well as remaining invitations. For example, if a user who has approval privileges denies an invitation to join the group-based communication channel, all pending invitations to join the channel transmitted to other users of that user's organization may be deleted. In some embodiments, it may be desirable to delete the pending invitations as well as data associated with the pending invitations to protect sensitive information of the invited users or of the organization. For example, if the pending invitations include an email address of the invited user, this invitation may be deleted to prevent the email address from being shared with an external entity.

It should be understood that similar steps as described with respect to FIG. 3B may be carried out in a scenario where the invitation expires. For example, if an invitation expires, the invitation and data associated with the invitation may be automatically deleted. In some embodiments, if one of a set of related invitations expires, all of the related invitations may be deleted along with data associated with said related invitations. For example, if some users have already accepted some of the respective invitations but a user with approval privileges has not and allows an invitation to expire, all invitation related data recorded for the accepting users may be deleted along with the related invitations.

Turning now to FIGS. 3C and 3D, a method 330 for opening and accepting an invitation within the group-based communication system is depicted relating to some embodiments. At step 332, the invitation is opened. In some embodiments, the invitation is opened in response to receiving a user input such as the user clicking on an invitation link. At step 334, it is determined whether the channel has previously been connected. For example, this may be the case if the channel has already been joined between the first organization 208 and the second organization 216. If it is determined that the channel has already been connected, the method 330 moves on to step 336. Alternatively, if it is determined that the channel has not already been connected, the method 330 continues instead to step 340.

At step 336 it is determined whether the channel to which the invitation is associated is a public channel. In such embodiments, a public channel may refer to a channel which is public and can be joined by any user. Alternatively, some channels may be private channels which only certain users (for example, only users that have received an invitation) can join. In some embodiments, users may require authentication to ensure that the user accepting the invitation is the user to which the invitation was sent to. In response to determining that the channel is a public channel, an instance of the channel is opened to the user at step 338. Alternatively, in response to determining that the channel is not a public channel an error is received and may be displayed to the user as an error message on the user's device.

At step 340 it is determined whether the invitation has already been accepted. If the invitation has been accepted, the method 330 continues to step 342. If it is determined that the invitation has not been accepted, the method 330 continues to step 350. At step 342 it is determined whether the channel to which the invitation is associated with is a public channel. If the channel is a public channel the user is added to the list of pending users at step 344. If the channel is not a public channel, a request to add the user to the list of pending users is submitted at step 346. At step 348, it is determined whether the submitted request is approved. If the request is approved the user is added to the list of pending users at step 344. Alternatively, if the request is not approved, an error is received.

At step 350 it is determined if the user is associated with either a free team status or a paid account status. In some embodiments, each user is associated with a team, which may identify an organization to which the user belongs to. For example, the free team status may be associated with a specific organization, such that users of that organization will have free team status. If the user is not associated with a paid account, it is determined whether the user is eligible at step 352. If the user is determined to be eligible, a paid-plan trial of the group-based communication system is offered to the user at step 354. In such embodiments, a paid plan of the group-based communication system may offer additional features and improvements when compared with a free plan of the group-based communication system. At step 356, team settings associated with the team to which the user belongs to are read. In some embodiments, the team settings are stored within the group-based communication system data store 162.

At step 358 it is determined whether the user is allowed to accept the invitation. In some embodiments, this determination may be made based on the team settings read at step 356. For example, the team settings may comprise information such as user permissions that indicate which users are allowed to accept invitations. If the user is allowed to accept the invitation, the invitation is accepted at step 360. Alternatively, if the user is not allowed to accept the invitation an error is received. In some embodiments, when the invitation is accepted at step 360, the channel is joined between the organizations. For example, if a user of the second organization 216 accepts an invitation sent from a user of the first organization 208 and it is determined that the user has permission to join channels between other organizations, the channel will be joined between the first organization 208 and the second organization 216 and the list of pending users will be automatically added to the channel. Further, after the channel is joined, the remaining invitations may be converted to open channel prompts. Additionally, in some embodiments, before a channel can be joined between multiple organizations, an approval must be received from each organization. In some embodiments, only administrators or users with a special permission are allowed to approve joining channels between other organizations.

Turning now to FIG. 4, a swim lane diagram is depicted illustrating the component responsibility flow for some embodiments and referred to generally by reference numeral 400. In some such embodiments, various steps are performed by one of the first user device 212, the group-based communication system server 158, the second user device 220, and the third user device 224. At step 402, an invitation request is submitted by the first user device 212. Such an invitation request may be initiated by the first user 210 operating the first user device 212. The invitation request is received by the group-based communication system server 158 at step 404. Here, the invitation request may comprise a request for a single invitation to add a specific user or a request for a plurality of invitations to add a respective plurality of users to the group-based communication channel.

At step 406 a first invitation transmitted by the group-based communication system server 158 to the second user device 220. At step 408 the first invitation is received by the second user device 220. Presuming the second user 218 accepts the invitation, the invitation is accepted by the second user device 220 at step 410 and the acceptance by the second user device 220 is received by the group-based communication system server 158 at step 412. At step 414, the group-based communication system server 158 adds the second user 218 to the list of pending users for the group-based communication channel in response to receiving the acceptance from the second user device 220 and because the second user 218 does not have approval privileges. It should be understood that, in some embodiments, if the second user 218 does have approval privileges, the steps may vary accordingly.

At step 416, a visibility control interface is transmitted from the group-based communication system server 158 to the second user device 220 allowing the second user 218 to adjust visibility control settings relating to the group-based communication channel while waiting to join the group-based communication channel. In some embodiments, the visibility control interface may be configured according to the second user 218 and the second user's permissions within the group-based communication system as retrieved from the group-based communication system data store 162. At step 418, the second user device 220 displays the visibility control interface to the second user 218. As described above the visibility control interface may be presented to the second user 218 based on the specific permissions of the second user 218. For example, if the second user 218 has permission to set the group-based communication channel to a private channel setting then a "set channel to private" option may be presented to the second user 218 on the visibility control interface. At step 420, a set of adjustments may be submitted from the second user device 220 and received by the group-based communication system server 158 at step 422, where the group-based communication system server 158 may apply the adjustments. Alternatively, in some embodiments, the adjustments may be applied when the group-based communication channel is joined.

At step 424, a second invitation is transmitted by the group-based communication system server 158 to a third user device 224. The second invitation may be sent in response to the received invitation request at step 404. At step 426 the third user device 224 receives the second invitation from the group-based communication system server 158 and presents the second invitation to the third user 222 operating the third user device 224. Presuming that the third user 222 accepts the second invitation, the invitation is accepted by the third user device 224 at step 428. At step 430 the group-based communication system server 158 receives the acceptance of the second invitation from the third user device 224. In response to determining that the third user 222 of the second organization 216 has approval privileges, the group-based communication system server 158 joins the group-based communication channel between the first organization 208 and the second organization 216 at step 432. At step 434, once the group-based communication channel is joined, the list of pending users is automatically added to the group-based communication channel including the second user 218 and the third user 222.

An exemplary scenario pertaining to the execution of the swim lane diagram 400 of FIG. 4 will now be described. For the purpose of the example, it is assumed that the first user device 212 is operated by the first user 210 of the first organization 208 who has approval privileges. Similarly, it is assumed that the second user device 220 is operated by the second user 218 who belongs to the second organization 216 but does not have approval privileges and that the third user device 224 is operated by the third user 222 of the second organization 216 who has approval privileges. Further, it should be understood, for the purpose of the example, that the first organization 208 is in a business relationship with the second organization 216. For example, the first organization 208 may be a software company and the second organization 216 may be an animation and graphics studio which the first organization 208 has hired to create computer graphics for a piece of software.

Beginning at step 402, the first user 210 operates the first user device 212 to submit an invitation request. For the purpose of the example, the first user 210 wishes to create a new group-based communication channel within the group-based communication system that will be shared between the first organization 208 and the second organization 216. Accordingly, the first user 210 submits the invitation request instructing the group-based communication system server 158 to invite the second user 218 and the third user 222 among other users to the new group-based communication channel. In some embodiments, the first user 210 may be prompted to submit the invitation request upon the new channel being created.

In response to receiving the invitation request at step 404, the group-based communication system server 158 transmits the first invitation at step 406. At step 408, the second user device 220 displays the first invitation to the second user 218, who accepts the first invitation at step 410 by operating the second user device 220. The first invitation may be displayed to the second user 218 as an invitation notification, similar to the user interface 500 shown in FIG. 5A. Once the second user 218 accepts the first invitation, the acceptance is received at step 412, where the group-based communication system server 158 receives the acceptance of the first invitation. Here, the acceptance may include information relating to the second user 218, such as the user's role within the second organization 216. For example, the group-based communication system server 158 may retrieve information that indicates that the second user 218 does not have approval privileges. Accordingly, upon determining that the second user 218 is not an administrator, the second user 218 will be added to the list of pending users at step 414.

Additionally, a visibility control interface is transmitted by the group-based communication system server 158 at step 416 for display to the second user 218 at the second user device 220 at step 418. The visibility control interface may be transmitted and displayed according to a role of the second user 218 or a set of permissions of the second user 218. Accordingly, the group-based communication system server 158 can present options for the second user 218 to adjust settings that the second user 218 has permission to configure. For example, the second user 218 may be prompted to change a channel setting of the group-based communication channel from private to public or vice versa based on the permissions of the second user 218. In some embodiments, if the second user 218 does not have any associated permissions, the visibility control interface may not be displayed to the user.

Assuming that the second user 218 has permission to adjust the channel settings, the second user 218 may submit an adjustment through the visibility control interface displayed on the second user device 220 at step 420 to change the channel setting from public to private. The adjustment is received by the group-based communication system server 158 at step 422. In some embodiments, the group-based communication system server 158 applies the adjustment upon receiving the adjustment from the second user 218. Accordingly, the channel setting is changed from public to private. Alternatively, the received adjustment may be stored and applied when the group-based communication channel is joined with the second organization 216. In some embodiments, adjustment information indicative of the submitted adjustment may be stored along with the list of pending users in the group-based communication system data store 162, such that the adjustment is applied whenever the list of pending users are added to the group-based communication channel.

At step 424 the second invitation is transmitted based on the received invitation request at step 404. It should be understood that, in some embodiments, the first and second invitations may be transmitted simultaneously. At step 426 the third user device 224 receives the second invitation and displays the second invitation to the third user 222. The third user 222 of the second organization 216, who has approval privileges, as described above, accepts the second invitation at step 428. The acceptance of the second invitation is received by the group-based communication system server 158 at step 430. Here, the group-based communication system server 158 also identifies that the third user 222 of the second organization 216 has permission to join the new group-based communication channel based on the third user's approval privileges. As such, the new group-based communication channel is joined between the first organization 208 and the second organization 216 at step 432 and the pending users from the list of pending users are added to the group-based communication channel at step 434, including the second user 218.

Once the channel is joined and users have been added to the channel all users within the channel may use the group-based communication channel (for example, to send messages, share files, and react to messages, as well as perform other communication operations based on the permissions of each respective user). For example, the third user 222 may send a message thanking the first user 210 for adding the second organization 216. It should be understood that, in some embodiments, the group-based communication channel is not created until the channel has been joined by the second organization 216. Further, in some embodiments, more than two organizations may be joined to the group-based communication channel. For example, a group-based communication channel is contemplated that is joined between the first organization 208, the second organization 216, and a third organization having a plurality of additional users.

Now turning to FIGS. 5A-5C, exemplary screenshots of a user interface 500 of the group-based communication system are depicted relating to certain embodiments of the invention. FIG. 5A shows user interface 500 displaying a notification for a user. It should be understood that the user may be any of the first user 210, the second user 218, or the third user 222, as well as any other user of the group-based communication system. Similarly, the user interface 500 may be displayed on any of the first user device 212, the second user device 220, third user device 224, or client devices 152-156, as described herein, as well as any other suitable computing device capable of displaying the user interface 500. The notification displays a header text 502 and a message text 504, as well as a button 506. In this instance, the notification pertains to an invitation giving the user the opportunity to join a channel. As such, the header text 502 reads "Join channel" and the message text 504 reads "You have been invited to the channel #org1-and-org2." Similarly, the button 506 reads "ACCEPT". Accordingly, if the button 506 is clicked by the user, the user may be added to the group-based communication channel that is referred to in the invitation.

FIG. 5B shows the user interface 500 for an exemplary notification relating to a user that attempts to join a channel which has not yet been joined by the user's organization. Here, the header text 502 reads "Channel is almost ready" and the message text 504 reads "This channel is awaiting approval. Once #org1-and-org2 is approved, you'll be added to the channel." Also, the button 506 reads "CONFIRM," allowing the user to confirm that the user wishes to be added to the group-based communication channel when the channel is joined.

FIG. 5C shows the user interface 500 for an exemplary notification relating to a user who has been added to a group-based communication channel that has already been joined by a user with approval privileges. Here, the header text 502 reads "Open channel" and the message text 504 reads "The channel #org1-and-org2 has been successfully joined. Open the channel?" Similarly, the button 506 reads "OPEN" allowing the user to open an instance of the group-based communication channel by clicking on the button 506. It should be understood that the specific text shown in FIGS. 5A-5C are just a few examples of text that may be displayed to the user and that many other types of notifications and variations in text may also be included.

It should be understood that the user interface 500 of FIGS. 5A-5C may be displayed according to the current status of the group-based communication channel. For example, the user interface 500 of FIG. 5A may be displayed before the channel has been joined. Alternatively, the invitation is converted to an open channel prompt and the user interface 500 of FIG. 5C is displayed if the group-based communication channel has already been joined by a user with approval privileges.

An exemplary scenario where the user interface 500 of FIG. 5C may be displayed will now be described. In some embodiments, the first user 210 may instruct the group-based communication system server 158 to send an invitation 214 to each of the second user 218, the third user 222, and the fourth user 226. Accordingly, the group-based communication system server 158 transmits the invitations. In the example, the second user 218 and the third user 222, who has approval privileges to add users of the second organization 216, accept their respective invitations. Accordingly, the group-based communication channel is joined between the first organization 208 and the second organization 216. Upon determining that the second organization has joined the group-based communication channel, the invitation sent to the fourth user 226, who has not yet accepted the invitation, is converted into an open channel prompt. When the invitation is converted into the open channel prompt, the user interface 500 may be displayed to the fourth user 226 on the fourth user device 228. If the fourth user accepts the open channel prompt, for example, by clicking the button 504, an instance of the group-based communication channel is opened for the fourth user 226 on the fourth user device 228.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of externally sharing a channel of a group-based communication system, the method comprising:
 receiving, from a first user associated with a first team, a request to share the channel with a second team distinct from the first team,
 wherein the channel belongs to the first team and the first user is a channel owner of the channel;
 responsive to the request to share the channel with the second team, transmitting a shared channel invitation to a second user associated with the second team;
 receiving an acceptance of the shared channel invitation from the second user; and
 responsive to receiving the acceptance of the shared channel invitation from the second user, adding a plurality of users from the second team to the channel.

2. The method of claim 1, further comprising:
 receiving, from the first user, a create request to create a new channel in the group-based communication system; and
 responsive to receiving the create request and the request to share the channel with the second team, generating the channel.

3. The method of claim 1, wherein the shared channel invitation includes an expiration period.

4. The method of claim 3, wherein the expiration period of the shared channel invitation is two weeks.

5. The method of claim 1, further comprising:
 identifying a status of the channel; and
 notifying the first user of the status of the channel.

6. The method of claim 1, further comprising:
 receiving, from the first user associated with the first team, an add request to add an individual user associated with the second team to the channel; and
 responsive to the add request to add the individual user to the channel, transmitting an individual shared channel invitation to the individual user associated with the second team.

7. The method of claim 1, further comprising:
 causing display of a list of pending users waiting for approval to join the channel.

8. One or more non-transitory computer-readable media storing computer-executable instructions that, when executed by at least one processor, perform a method of externally sharing a channel of a group-based communication system, the method comprising:
 receiving, from a first user associated with a first team, a request to share the channel with a second team distinct from the first team,
 wherein the channel belongs to the first team and the first user is a channel owner of the channel;
 responsive to the request to share the channel with the second team, transmitting a shared channel invitation to a second user associated with the second team;
 receiving an acceptance of the shared channel invitation from the second user; and
 responsive to receiving the acceptance of the shared channel invitation from the second user, adding a plurality of users from the second team to the channel.

9. The one or more non-transitory computer-readable media of claim 8, the method further comprising:
 receiving, from the first user, a create request to create a new channel in the group-based communication system; and
 responsive to receiving the create request and the request to share the channel with the second team, generating the channel.

10. The one or more non-transitory computer-readable media of claim 8, wherein the shared channel invitation includes an expiration period.

11. The one or more non-transitory computer-readable media of claim 10, wherein the expiration period of the shared channel invitation is two weeks.

12. The one or more non-transitory computer-readable media of claim 8, the method further comprising:
 identifying a status of the channel; and
 notifying the first user of the status of the channel.

13. The one or more non-transitory computer-readable media of claim 8, the method further comprising:
 receiving, from the first user associated with the first team, an add request to add an individual user associated with the second team to the channel; and
 responsive to the add request to add the individual user to the channel, transmitting an individual shared channel invitation to the individual user associated with the second team.

14. The one or more non-transitory computer-readable media of claim 8, the method further comprising:
 causing display of a list of pending users waiting for approval to join the channel.

15. A system comprising:
 at least one processor; and
 one or more non-transitory computer-readable media storing computer-executable instructions that, when executed by the at least one processor, perform a method of externally sharing a channel of a group-based communication system, the method comprising:
  receiving, from a first user associated with a first team, a request to share the channel with a second team distinct from the first team,
  wherein the channel belongs to the first team and the first user is a channel owner of the channel;
  responsive to the request to share the channel with the second team, transmitting a shared channel invitation to a second user associated with the second team;
  receiving an acceptance of the shared channel invitation from the second user; and
  responsive to receiving the acceptance of the shared channel invitation from the second user, adding a plurality of users from the second team to the channel.

16. The system of claim 15, the method further comprising:
 receiving, from the first user, a create request to create a new channel in the group-based communication system; and
 responsive to receiving the create request and the request to share the channel with the second team, generating the channel.

17. The system of claim 15, wherein the shared channel invitation includes an expiration period.

18. The system of claim 17, wherein the expiration period of the shared channel invitation is two weeks.

19. The system of claim 15, the method further comprising:
 identifying a status of the channel; and notifying the first user of the status of the channel.

20. The system of claim 15, the method further comprising:
- receiving, from the first user associated with the first team, an add request to add an individual user associated with the second team to the channel; and
- responsive to the add request to add the individual user to the channel, transmitting an individual shared channel invitation to the individual user associated with the second team.

* * * * *